United States Patent [19]

Castle et al.

[11] Patent Number: 4,474,688

[45] Date of Patent: Oct. 2, 1984

[54] IMMOBILIZATION OF ACTINIDES BY ELECTROPOLYMERIZATION

[75] Inventors: Peter M. Castle, Penn Hills; James D. B. Smith; D. Colin Phillips, both of Monroeville, all of Pa.

[73] Assignee: Westinghouse Electric Corp., Pittsburgh, Pa.

[21] Appl. No.: 264,316

[22] Filed: May 18, 1981

[51] Int. Cl.$^3$ ........................ C09K 11/04; C25B 3/10; C08F 2/58

[52] U.S. Cl. ................................ 252/628; 204/59 R; 204/72; 204/73 A; 204/159.22

[58] Field of Search ............ 204/59, 72, 73 A, 159.22; 252/628

[56] References Cited

U.S. PATENT DOCUMENTS

| | | | |
|---|---|---|---|
| 3,489,663 | 1/1970 | Bayer | 204/59 R |
| 3,838,061 | 9/1974 | Cuaz | 252/628 |
| 3,852,403 | 12/1974 | Booth | 423/18 |
| 4,156,658 | 5/1979 | Mercer | 252/628 |
| 4,185,077 | 1/1980 | Albright | 423/7 |
| 4,199,470 | 4/1980 | Yasuda | 252/184 |

FOREIGN PATENT DOCUMENTS 566274 11/1958 Canada .

OTHER PUBLICATIONS

*Chemical Abstracts,* vol. 78, No. 26, 1973, Abstract No. 160151p, Martinmaa, Juleka, "Sulfolane II. Electro-Initiated Polymerization of Vinyl Monomers".

*Chemical Abstracts,* vol. 83, No. 22, 1975, Abstract No. 179674m, Trifonou, A. Z., "Electrochemically Initiated Polymerization of 1-Vinylimidazole".

*Primary Examiner*—Benjamin R. Padgett
*Assistant Examiner*—Anne Brookes
*Attorney, Agent, or Firm*—R. D. Fuerle

[57] ABSTRACT

A method is disclosed of immobilizing actinide metal oxide ions. A liquid composition is prepared of the actinide metal oxide ions and a monomer which is capable during electropolymerization of complexing with the actinide metal ions. An optional polar solvent may be included in the composition if it is necessary to dissolve a solid monomer. The monomer is then electropolymerized to form a polymeric complex with the actinide metal oxide ion. The polymeric complex can be separated from the remainder of the liquid composition by the addition of a non-solvent for the polymeric complex which results in its precipitation. Vinylimidazoles have been found to be suitable monomers for use in this process.

14 Claims, No Drawings

IMMOBILIZATION OF ACTINIDES BY ELECTROPOLYMERIZATION

BACKGROUND OF THE INVENTION

The safe containment and disposal of nuclear wastes is at present one of the largest public relations stumbling blocks facing the widespread acceptance and utilization of nuclear power generation. One of the severe technical problems which must be overcome in developing a safe disposal system is the unacceptable high leach rate of radioactive material from the various glasses, ceramics, and mineral based matrices which have been proposed for nuclear waste containment. In all of these materials, the nuclear material is physically held but is not chemically bound and thus can be leached out of the material.

SUMMARY OF THE INVENTION

We have discovered a method of immobilizing actinide metal oxide ions by chemically complexing them with an electropolymerized monomer. Because the actinides are chemically bound to the matrix material, they cannot be leached out in storage.

Unlike many of the prior processes for the containment of nuclear waste which required very high temperatures to melt glasses or ceramics, the process of this invention can be performed at room temperature. The process of this invention is very inexpensive and does not require large amounts of capital equipment.

DESCRIPTION OF THE INVENTION

In the first step of this invention, a liquid composition is prepared which contains the actinide metal oxide ion, a monomer capable during electropolymerization of complexing with the actinide metal oxide ion, and an optional solvent.

The monomer which forms a complex with the metal oxide ion during polymerization preferably has the general formula

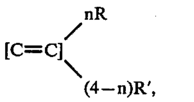

where n is an integer from 1 to 3, each R is independently selected from hydrogen, alkyl to $C_9$, and aryl, and each R′ is independently selected from

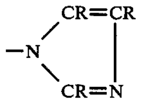

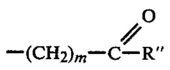

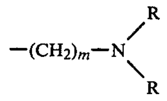

$-(CH_2)_m-O-R$ where m is an integer from 0 to 3 and R″ is R or OR. In the general formula R′ is preferably

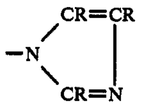

where R is hydrogen or methyl, and n is preferably 3, because these vinyl imidazole compounds have been found to work very well. The monomer is preferably a liquid, in which case a solvent may not be necessary in the composition. If the monomer is a low-melting solid, it may also be possible to eliminate the solvent by heating up the monomer and melting it.

If a solid monomer is used it is necessary to add a polar solvent in which both the monomer and the metal oxide ion are soluble. Suitable polar solvents include sulfolane, dimethyl formamide, acetyl nitrile, dimethyl acetamide, water, and dimethyl sulfoxide. The preferred polar solvent is sulfolane because it has good conductivity and vinylimidazoles are readily soluble in it, so a composition of high solids concentration can be produced. It is generally desirable to keep the amount of solvent as low as possible in order to avoid handling large quantities of liquid.

The actinide metal oxide ion which is to be immobilized can be formed by processes well known in the art if it is not produced in that form. The ion has the general formula $MO_2^{++}$ or $M_2O_4^{++}$ where M is an actinide element, an element having an atomic number 90 to 103. Uranium is the actinide metal which generally must be handled and it typically comes in the form of $UO_2^{++}$, the uranyl ion, which is often associated with a nitrate anion. The amount of monomer used should be stoichiometric with the amount of metal oxide ion to be immobilized, though a 10% molar excess either way can be used.

Once the composition has been prepared it is placed in an electrolytic cell, a container holding two electrodes. The electrodes may be made of any inert conductor but platinum is preferred as it has been found to work well. The electrodes are preferably placed at least one centimeter apart as at closer distances plugging or arcing can occur between the electrodes. Electrodes should be less than about 3 centimeters apart, however, as greater distances require too much voltage. Any size electrodes may be used.

The current density should be at least about one $mA/cm^2$ as at lesser current densities the reaction is too slow. The current density should not be greater than about 1000 $mA/cm^2$, however, as greater current densities may start to boil the composition. The preferred range of current densities is about 5 to about 10 $mA/cm^2$. Typically, about 1 minute to about 1 hour is required to produce the polymer complex, depending on the current density that is used.

While we do not wish to be bound by any theories, we believe that the following equations described what occurs when vinylimidazole is polymerized in the presence of the uranyl ion.

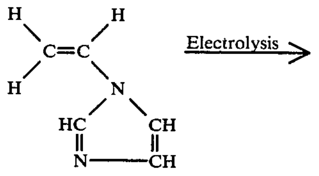

-continued

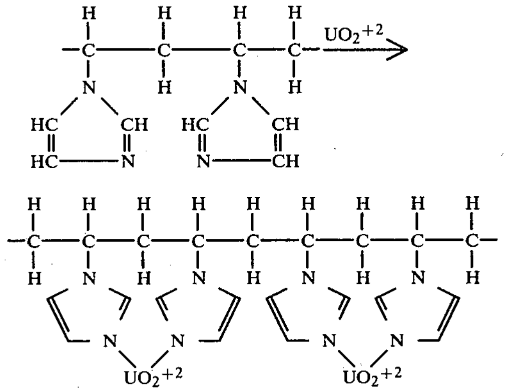

The process of this invention can be performed as a batch reaction or continuously, by continuously removing small quantities of the composition from the electrolytic cell while adding fresh monomer. The polymeric complex may be separated from the remainder of the composition by a variety of methods. The preferred method is the addition of a compound which is a non-solvent for the polymer but which is a solvent for the monomer, thereby precipitating the polymer. Suitable non-solvents include nonane, pentane, hexane, acetone, methyl-ethyl ketone, cyclohexane, and tetrohydrofuran. The preferred non-solvent is a mixture of about 4 parts acetone to 1 part hexane as that mixture has been found to give good separation.

The following examples further illustrate this invention.

EXAMPLE

Electropolymerization experiments using 2-methyl-1-vinylimidazole and 1-vinylimidazole were conducted in a 250 milliliter reaction flask fitted with inlet and outlet connections for nitrogen. The electrolytic cell consisted of 2 electrodes of platinum each 2 in.×1 in.×0.02 inches. The separation between the electrodes was held constant at 2 centimeters. A water jacket was placed around the cell to maintain a constant temperature of 25° C. during the reaction. Experiments were conducted under conditions of constant DC voltage at 75 mA. A wide range of experimental conditions were tried and the best conditions for electro-initiation were found using bulk monomer, (i.e., no solvent) and uranyl nitrate at a mole ratio of monomer to uranyl nitrate of 140:1, not the optimum ratio. The solution was poured into a 4:1 acetone-hexane mixture to precipitate the polymer product, which was filtered off. Typical polymerization rates are shown in the following table:

| Reaction Time (minutes) | Percent Product Formed on Monomer: 1-Vinyl-imidazole | Percent Product Formed on Monomer: 2-Methylvinyl-imidazole |
|---|---|---|
| 100 | 0.9 | 0.4 |
| 150 | 1.4 | 0.6 |
| 200 | 1.8 | 0.8 |
| 250 | 2.2 | 1.0 |

The above table shows that 1-vinylimidazole (1-VI) polymerizes faster than 2-methylvinylimidazole (2-MVI) under the conditions of the experiment. The control solutions, which did not have any current passed through them, gave no product under these conditions.

The chemical compositions and intrinsic viscosities of the polymer products obtained are shown in the following table:

| Polymer | C % | H % | N % | U %* | Polymer Intrinsic Viscosity [η] (Dl/g) |
|---|---|---|---|---|---|
| 2-MVI | 17.8 | 2.5 | 7.6 | >10 | 0.11 |
| 1-VI | 20.1 | 2.5 | 11.1 | >10 | 0.13 |

*Data from emission spectral analysis

The above table shows that a significant level (greater than 10%) of uranium was detected in the polymer along with low carbon, hydrogen, and nitrogen contents. This indicates that uranyl nitrate units were reacted into the structure of the polymer. These uranyl nitrate polymers were found to be soluble only in 10 normal hydrochloric acid and would not dissolve in acetone, ethylalcohol, hexane, water, dimethylacetamide, or dimethylsulfoxide. Repeated purifications did not change the composition of these products, which show that the uranium was tightly bound to the polymer. The intrinsic viscosities (η) obtained in 1/10 normal hydrochloric acid solution were low, indicating that the molecular weights were low, but that they were high enough to show that polymerization had occurred between the adjacent vinyl groups (i.e., carbon to carbon links had been formed).

Infrared spectra using the KBr pellet technique were also obtained with these polymer products and provided further evidence for the reaction of the uranyl nitrate units into the polymer structure. Very broad absorption bands were detected which were attributable to the presence of $UO_2(NO_3)_2$.

What we claim is:

1. A method of bonding actinide metal oxide ions comprising:

(A) preparing a liquid composition which comprises:

(1) said actinide metal oxide ions, and (2) a monomer capable, during electropolymerization, of complexing with said actinide metal oxide ions;

(B) electropolymerizing said monomer to form a complex with said actinide metal oxide ions; and (C) separating said complex from said liquid composition.

2. A method according to claim 1 wherein said actinide metal oxide ion has the general formula $MO_2^{++}$ or $M_2O_4^{++}$, where M is an actinide metal.

3. A method according to claim 2 wherein said actinide metal oxide ion has the general formula $MO_2^{++}$ and M is uranium.

4. A method according to claim 1 wherein said monomer has the general formula

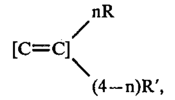

where n is an integer from 1 to 3, each R is independently selected from hydrogen, alkyl to $C_9$, and aryl, and each R' is independently selected from

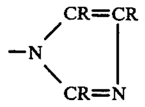

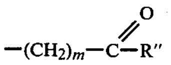

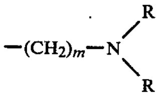

$-(CH_2)_m-O-R$ where m is an integer from 0 to 3 and R" is R or OR.

5. A method according to claim 4 wherein n is 3, R' is

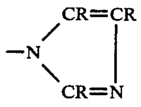

and R is H or $CH_3$.

6. A method according to claim 1 wherein said monomer is a liquid.

7. A method according to claim 1 wherein said composition includes a polar solvent for said monomer and said actinide metal oxide ion.

8. A method according to claim 7 wherein said polar solvent is sulfolane.

9. A method according to claim 1 wherein the amount of said monomer is stoichiometric ±10 mole percent.

10. A method according to claim 1 wherein said electropolymerization is conducted at a current density of about 1 to about 1000 mA/cm$^2$.

11. A method according to claim 10 wherein said complex is separated from said composition by the addition of a non-solvent for said complex, but not for said monomer, thereby precipitating said complex, but not said monomer.

12. A method according to claim 11 wherein said non-solvent is a mixture of about 4 parts acetone to one part hexane.

13. A method according to claim 4 wherein R' is

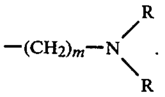

14. A method according to claim 4 wherein R' is $-(CH_2)_m-O-R$.

* * * * *